US009473423B2

United States Patent
Ayandeh

(10) Patent No.: US 9,473,423 B2
(45) Date of Patent: Oct. 18, 2016

(54) INTER DOMAIN LINK FOR FIBRE CHANNEL

(75) Inventor: Siamack Ayandeh, Littleton, MA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 51 days.

(21) Appl. No.: 14/372,541

(22) PCT Filed: Apr. 25, 2012

(86) PCT No.: PCT/US2012/034995
§ 371 (c)(1),
(2), (4) Date: Jul. 16, 2014

(87) PCT Pub. No.: WO2013/162549
PCT Pub. Date: Oct. 31, 2013

(65) Prior Publication Data
US 2015/0071288 A1    Mar. 12, 2015

(51) Int. Cl.
| H04W 4/00 | (2009.01) |
| H04J 3/16 | (2006.01) |
| H04L 12/937 | (2013.01) |
| H04L 12/931 | (2013.01) |
| H04L 12/715 | (2013.01) |
| H04L 12/733 | (2013.01) |

(52) U.S. Cl.
CPC ............ *H04L 49/253* (2013.01); *H04L 45/04* (2013.01); *H04L 45/122* (2013.01); *H04L 49/357* (2013.01)

(58) Field of Classification Search
CPC ................... H04L 29/12207; H04L 61/6045; H04L 61/20; H04L 29/12886
See application file for complete search history.

(56) References Cited

U.S. PATENT DOCUMENTS

| 8,514,856 B1* | 8/2013 | Gai .................. H04L 29/08702 370/389 |
| 8,621,095 B1* | 12/2013 | Desanti ................ H04L 49/357 709/224 |
| 8,948,176 B1* | 2/2015 | Desanti .................. H04L 45/44 370/351 |
| 2003/0026267 A1* | 2/2003 | Oberman ............... H04L 47/10 370/397 |

(Continued)

FOREIGN PATENT DOCUMENTS

CN    10-02291465 A    12/2011

OTHER PUBLICATIONS

Kamiya, S. et al, "Advanced FCoE: Extension of Fibre Channel Over Ethernet" Sep. 9, 2011.

(Continued)

*Primary Examiner* — Melanie Jagannathan
(74) *Attorney, Agent, or Firm* — Hewlett Packard Enterprise Patent Department

(57) ABSTRACT

A method includes establishing a communication link between a first Fiber Channel Forwarder (FCF) and a Fiber Channel (FC) fabric. The first FCF provides a first domain. The method includes establishing a communication link between a second FCF and the FC fabric. The second FCF provides a second domain. The method includes establishing a first intra-domain link between the first FCF and a first device. The first device including one of a Fiber channel over Ethernet Data Forwarder (FDF) and a Fiber Channel Data Forwarder (FCDF). The method includes establishing an inter domain link between the first device and the second domain.

15 Claims, 9 Drawing Sheets

(56) References Cited

U.S. PATENT DOCUMENTS

| | | | |
|---|---|---|---|
| 2009/0254677 A1* | 10/2009 | Desanti | H04L 41/12 709/242 |
| 2009/0292813 A1 | 11/2009 | Snively et al. | |
| 2011/0044344 A1 | 2/2011 | Hudson et al. | |
| 2011/0135303 A1 | 6/2011 | Hufferd | |
| 2011/0176412 A1 | 7/2011 | Stine et al. | |
| 2011/0255540 A1 | 10/2011 | Mizrahi et al. | |
| 2011/0261826 A1* | 10/2011 | Armstrong | H04L 49/357 370/401 |
| 2011/0274114 A1 | 11/2011 | Dhar et al. | |
| 2012/0039163 A1* | 2/2012 | Nakajima | H04L 41/0654 370/217 |
| 2012/0106957 A1* | 5/2012 | Willeke | H04L 29/12207 398/58 |
| 2012/0177370 A1* | 7/2012 | Berman | H04L 49/357 398/58 |
| 2013/0287389 A1* | 10/2013 | Ayandeh | H04L 41/0668 398/5 |

OTHER PUBLICATIONS

Claudio Desanti, "VA_Ports: FDF / Controlling FCF Protocols," T11/10-271v3, Oct. 20, 2010, pp. 1-35, XP055228489, Cisco.

Extended European Search Report, EP Application No. 12875654.1, Date: Nov. 20, 2015, pp. 1-8.

International Search Report and Written Opinion, International Application No. PCT/US2012/034995, Date: Dec. 18, 2012, pp. 1-7.

* cited by examiner

FDF N_PORT_ID RANGE NOTIFICATION PAYLOAD — 440

| ITEM | SIZE (BYTES) |
|---|---|
| SW_ILS CODE = XX00 000XH | 4 |
| ORIGINATING FCDF SWITCH_NAME | 8 |
| DESTINATION ADJACENT SWITCH SWITCH_NAME | 8 |
| NUMBER OF N_PORT_ID RANGES (q) | 4 |
| N_PORT_ID RANGE #1 | 4 |
| N_PORT_ID RANGE #2 | 4 |
| . | . |
| . | . |
| N_PORT_ID RANGE #q | 4 |

INTER DOMAIN LINK FOR FIBRE CHANNEL

BACKGROUND

Fibre Channel (FC) and Fibre Channel over Ethernet (FCoE) switches are used in Storage Area Networks (SANs) to route communications between host devices and storage devices. One type of switch includes a distributed switch that divides the switching functions into two separate devices including a controlling device and one or more peripheral devices under the control of the controlling device. The distributed switch defines a domain in which intra-domain links may be made between the controlling device and each of the peripheral devices. A controlling device or a peripheral device, however, cannot link to a peripheral device that is part of a different domain.

DETAILED DESCRIPTION

In the following detailed description, reference is made to the accompanying drawings which form a part hereof, and in which is shown by way of illustration specific examples in which the invention may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined with each other, unless specifically noted otherwise.

Figure 1:
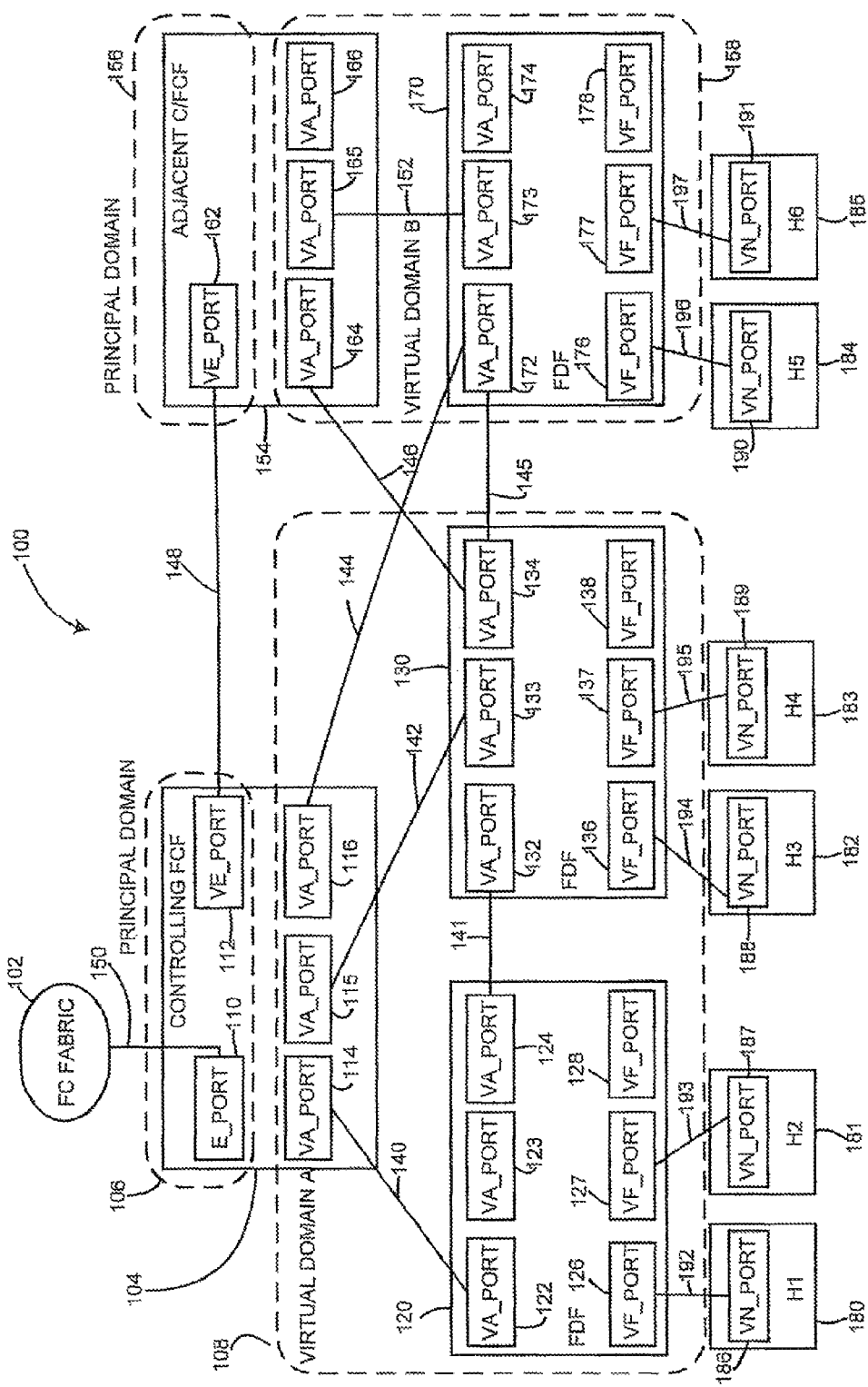
FIG. 1 is a block diagram illustrating one example of a Fibre Channel (FC) system including an inter domain Virtual A_Port (VA_Port) virtual link for Fibre Channel over Ethernet (FCoE).

FIG. 1 is a block diagram illustrating one example of a Fibre Channel (FC) system 100 including an inter domain Virtual A_Port (VA_Port) virtual link for Fibre Channel over Ethernet (FCoE). System 100 includes a FC fabric 102, a controlling FCoE Forwarder (FCF) 104, a first FCoE Data Forwarder (FDF) 120, a second FDF 130, an adjacent controlling FCF (c/FCF) 154, a third FDF 170, and hosts 180-185. In this example, system 100 includes a first inter domain VA_Port virtual link 144 between controlling FCF 104 and third FDF 170 and a second inter domain VA_Port virtual link 146 between adjacent controlling FCF 154 and second FDF 130. System 100 also includes a third inter domain VA_Port virtual link 145 between second FDF 130 and third FDF 170.

The inter domain VA_Port virtual links 144, 145, and 146 add flexibility to a Storage Area Network (SAN) topology and enable a flatter network topology. By removing hops in the network, inter domain VA_Port virtual links 144, 145, and 146 can reduce the cost of system 100 and reduce the end to end latency of the system compared to systems in which inter domain VA_Port virtual links cannot be used. In addition, inter domain VA_Port virtual links 144, 145, and 146 also enable improved load balancing beyond that provided by conventional primary and secondary FCF configurations. If primary and secondary FCFs are used, inter domain VA_Port virtual links 144, 145, and 146 can reduce the amount of traffic that is lost in the process of a primary to a secondary FCF switch over, thereby improving high availability operations.

Controlling FCF 104 includes an E_Port 110, a Virtual E_Port (VE_Port) 112, and Virtual A_Ports (VA_Ports) 114, 115, and 116. In other examples, controller FCF 104 includes any suitable number of E_Ports, VE_Ports, and VA_Ports. First FDF 120 includes VA_Ports 122, 123, and 124 and Virtual F_Ports (VF_Ports) 126, 127, and 128. In other examples, first FDF 120 includes any suitable number of VA_Ports and VF_Ports. Second FDF 130 includes VA_Ports 132, 133, and 134 and VF_Ports 136, 137, and 138. In other examples, second FDF 130 includes any suitable number of VA_Ports and VF_Ports.

Adjacent controlling FCF 154 includes a VE_Port 162 and VA_Ports 164, 165, and 166. In other examples, adjacent controlling FCF 154 includes any suitable number of E_Ports, VE_Ports, and VA_Ports. Third FDF 170 includes VA_Ports 172, 173, and 174 and VF_Ports 176, 177, and 178. In other examples, third FDF 170 includes any suitable number of VA_Ports and VF_Ports.

Host (H1) 180 includes a Virtual N_Port (VN_Port) 186. Host (H2) 181 includes a VN_Port 187. Host (H3) 182 includes a VN_Port 188. Host (H4) 183 includes a VN_Port 189. Host (H5) 184 includes a VN_Port 190, and Host (H6) 185 includes a VN_Port 191. Each host 180-185 includes a server, a computer, a disk storage device, or other suitable device capable of initiating and/or receiving communications in system 100.

E_Port 110 and VE_Port 112 of controlling FCF 104 are part of the principal domain 106. VA_Ports 114, 115, and 116 of controlling FCF 104, first FDF 120, and second FDF 130 are part of virtual domain A 108. VE_Port 162 of adjacent controlling FCF 154 is part of the principal domain

156. VA_Ports 164, 165, and 166 of adjacent controlling FCF 154 and third FDF 170 are part of virtual domain B 158.

E_Port 110 of controlling FCF 104 is communicatively coupled to FC fabric 102 through an FC link 150. VE_Port 112 of controlling FCF 104 is communicatively coupled to VE_Port 162 of adjacent controlling FCF 154 through a principle domain VE_Port virtual link 148. In other examples, principle domain VE_Port virtual link 148 may be excluded if adjacent controlling FCF 154 is communicatively coupled to FC fabric 102 through an FC link.

VA_Port 114 of controlling FCF 104 is communicatively coupled to VA_Port 122 of first FDF 120 through an intra-domain VA_Port virtual link 140. VA_Port 115 of controlling FCF 104 is communicatively coupled to VA_Port 133 of second FDF 130 through an intra-domain VA_Port virtual link 142. VA_Port 116 of controlling FCF 104 is communicatively coupled to VA_Port 172 of third FDF 170 through an inter domain VA_Port virtual link 144. VA_Port 124 of first FDF 120 is communicatively coupled to VA_Port 132 of second FDF 130 through bypass intra-domain VA_Port virtual link 141. VA_Port 134 of second FDF 130 is communicatively coupled to VA_Port 172 of third FDF 170 through an inter domain VA_Port virtual link 145.

VF_Port 126 of first FDF 120 is communicatively coupled to VN_Port 186 of Host (H1) 180 through virtual link 192. VF_Port 127 of first FDF 120 is communicatively coupled to VN_Port 187 of Host (H2) 181 through virtual link 193, VF_Port 136 of second FDF 130 is communicatively coupled to VN_Port 188 of Host (H3) 182 through virtual link 194. VF_Port 137 of second FDF 130 is communicatively coupled to VN_Port 189 of Host (H4) 183 through virtual link 195.

VA_Port 164 of adjacent controlling FCF 154 is communicatively coupled to VA_Port 134 of second FDF 130 through an inter domain VA_Port virtual link 146. VA_Port 165 of adjacent controlling FCF 154 is communicatively coupled to VA_Port 173 of third FDF 170 through an intra-domain VA_Port virtual link 152. VF_Port 176 of third FDF 170 is communicatively coupled to VN_Port 190 of Host (H5) 184 through virtual link 196. VF_Port 177 of third FDF 170 is communicatively coupled to VN_Port 191 of Host (H6) 185 through virtual link 197.

In one example, FC link 150 is a native FC communication link. In one example, intra-domain VA_Port virtual links 140, 141, 142, and 152, and inter domain VA_Port virtual links 144, 145, and 146 are each lossless Ethernet communication links. In one example, principle domain VE_Port virtual link 148 and virtual links 192-197 are each lossless Ethernet communication links. The Ethernet communication links may be either point to point communication links or switched network communication links.

FC fabric 102 is communicatively coupled to storage devices, FC switches, and/or other suitable devices for providing a SAN. Controlling FCF 104 controls first FDF 120 and second FDF 130 to provide a first distributed switch. Controlling FCF 104 maintains routing tables for routing communications based on FC destination addresses. Controlling FCF 104 forwards FC frames to and from FC fabric 102 via FC link 150. Controlling FCF 104 also forwards FC frames to and from first FDF 120 and second FDF 130 via intra-domain VA_Port virtual links 140 and 142, respectively. Controlling FCF 104 also forwards FC frames to and from adjacent controlling FCF 154 via principal domain VE_Port virtual link 148. First FDF 120 and second FDF 130 each maintain routing tables for routing communications based on FC destination addresses. First FDF 120 and second FDF 130 forward FC frames to and from each other via intra-domain VA_Port virtual link 141. First FDF 120 and second FDF 130 forward FC frames to and from hosts 180-183 through virtual links 192-195, respectively.

Likewise, adjacent controlling FCF 154 controls third FDF 170 to provide a second distributed switch. Adjacent controlling FCF 154 maintains routing tables for routing communications based on FC destination addresses. Adjacent controlling FCF 154 forwards FC frames to and from controlling FCF 104 via principal domain VE_Port virtual link 148. Adjacent controlling FCF 154 also forwards FC frames to and from third FDF 170 via intra-domain VA_Port virtual link 152. Third FDF 170 maintains routing tables for routing communications based on FC destination addresses. Third FDF 170 forwards FC frames to and from hosts 184 and 185 through virtual links 196 and 197, respectively.

In addition to forwarding FC frames via intra-domain VA_Port virtual links 140, 142, and 152, controlling FCF 104 can also forward FC frames to and from third FDF 170 via inter domain VA_Port virtual link 144, and adjacent controlling FCF 154 can forward FC frames to and from second FDF 130 via inter domain VA_Port virtual link 146. Thus, for example, an FC frame initiated at host (H4) 183 can be forwarded to host (H5) 184 via second FDF 130, adjacent controlling FCF 154, and third FDF 170 without having to be forwarded through controlling FCF 104. Likewise, for example, an FC frame initiated at host (H6) 185 can be forwarded to host (H1) 180 via third FDF 170, controlling FCF 104, and first FDF 120 without having to be forwarded through adjacent controlling FCF 154.

In addition, second FDF 130 can forward FC frames to and from third FDF 170 via inter domain VA_Port virtual link 145. Thus, for example, an FC frame initiated at host (H4) 183 can be forwarded to host (H5) 184 via second FDF 130 and third FDF 170 without having to be forwarded through controlling FCF 104 or adjacent controlling FCF 154.

To maintain inter domain VA_Port virtual links 144, 145, and 146, the principal domain VE_Port virtual link 148 or a link between FC fabric 102 and each of controlling FCF 104 and adjacent controlling FCF 154 needs to be maintained. If the principal domain VE_Port virtual link 148 and links between FC fabric 102 and each of controlling FCF 104 and adjacent controlling FCF 154 are broken, the inter domain VA_Port virtual links 144, 145, and 146 will also be broken.

Figure 2:
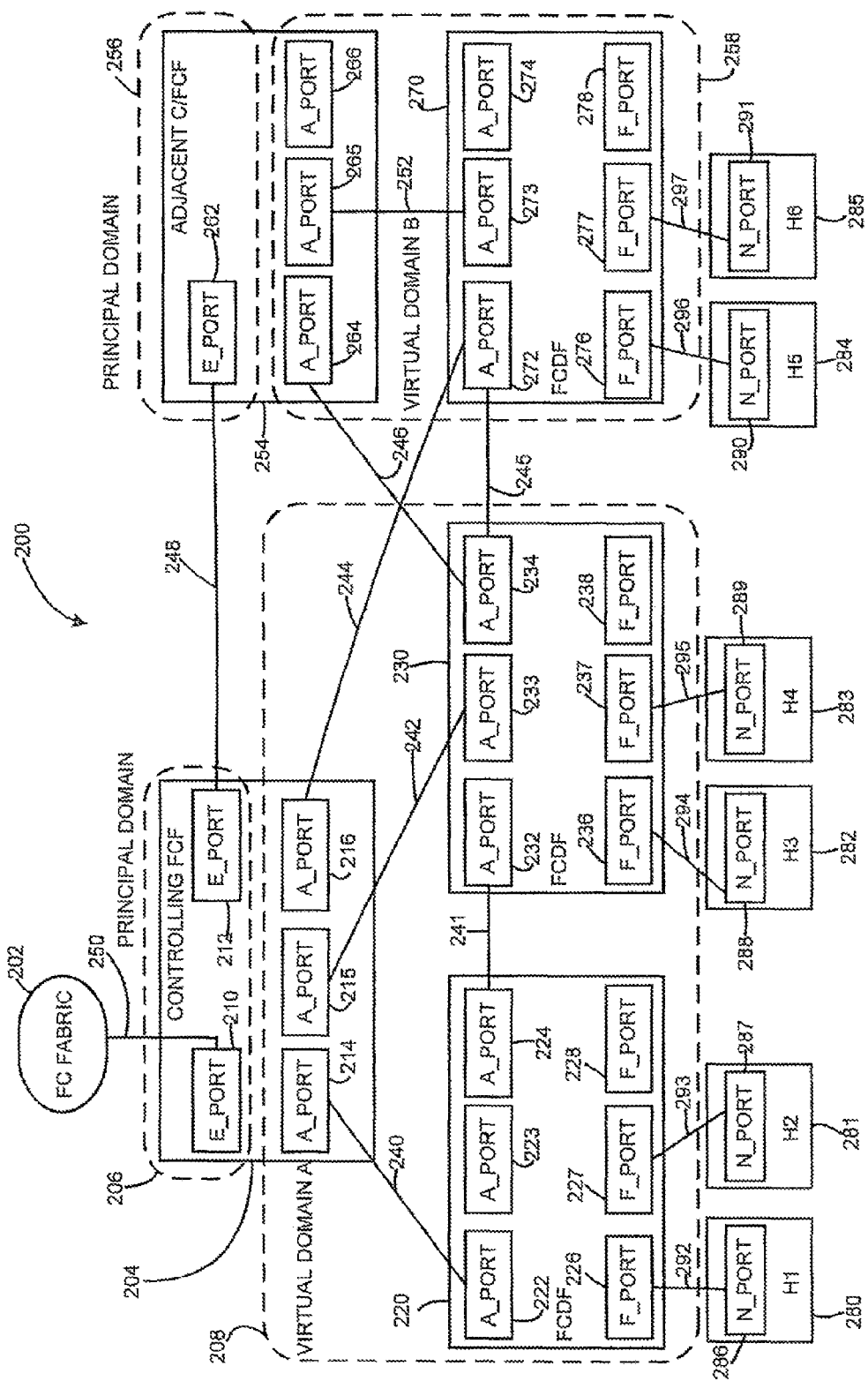
FIG. 2 is a block diagram illustrating another example of a FC system including an inter domain A_Port link for native FC.

FIG. 2 is a block diagram illustrating another example of a FC system 200 including an inter domain A_Port link for native FC. FC system 200 differs from FC system 100 previously described and illustrated with reference to FIG. 1 in that FC system 200 uses native FC rather than FCoE.

System 200 includes a FC fabric 202, a controlling FCF 204, a first FC Data Forwarder (FCDF) 220, a second FCDF 230, an adjacent controlling FCF (c/FCF) 254, a third FCDF 270, and hosts 280-285. In this example, system 200 includes a first inter domain A_Port link 244 between controlling FCF 204 and third FCDF 270 and a second inter domain A_Port link 246 between adjacent controlling FCF 254 and second FCDF 230. System 200 also includes a third inter domain VA_Port virtual link 245 between second FCDF 230 and third FCDF 270. The inter domain links 244, 245, and 246 provide the same advantages as inter domain virtual links 144, 145, and 146 previously described and illustrated with reference to FIG. 1.

Controlling FCF 204 includes E_Ports 210 and 212 and A_Ports 214, 215, and 216. In other examples, controller FCF 204 includes any suitable number of E_Ports and A_Ports. First FCDF 220 includes A_Ports 222, 223, and 224 and F_Ports 226, 227, and 228. In other examples, first FCDF 220 includes any suitable number of A_Ports and F_Ports. Second FCDF 230 includes A_Ports 232, 233, and 234 and F_Ports 236, 237, and 238. In other examples, second FCDF 230 includes any suitable number of A_Ports and F_Ports.

Adjacent controlling FCF 254 includes an E_Port 262 and A_Ports 264, 265, and 266. In other examples, adjacent controlling FCF 254 includes any suitable number of E_Ports and A_Ports. Third FCDF 270 includes A_Ports 272, 273, and 274 and F_Ports 276, 277, and 278. In other examples, third FCDF 270 includes any suitable number of A_Ports and F_Ports.

Host (H1) 280 includes an N_Port 286. Host (H2) 281 includes an N_Port 287. Host (H3) 282 includes an N_Port 288. Host (H4) 283 includes an N_Port 289. Host (H5) 284 includes an N_Port 290, and Host (H6) 285 includes an N_Port 291. Each host 280-285 includes a server, a computer, a disk storage device, or other suitable device capable of initiating and/or receiving communications in system 200.

E_Port 210 and E_Port 212 of controlling FCF 204 are part of the principal domain 206. A_Ports 214, 215, and 216 of controlling FCF 204, first FCDF 220, and second FCDF 230 are part of virtual domain A 208. E_Port 262 of adjacent controlling FCF 254 is part of the principal domain 256. A_Ports 264, 265, and 266 of adjacent controlling FCF 254 and third FCDF 270 are part of virtual domain B 258.

E_Port 210 of controlling FCF 204 is communicatively coupled to FC fabric 202 through an FC link 250. E_Port 212 of controlling FCF 204 is communicatively coupled to E_Port 262 of adjacent controlling FCF 254 through a principle domain E_Port link 248. In other examples, principle domain E_Port virtual link 248 may be excluded if adjacent controlling FCF 254 is communicatively coupled to FC fabric 202 through an FC link.

A_Port 214 of controlling FCF 204 is communicatively coupled to A_Port 222 of first FCDF 220 through an intra-domain A_Port link 240. A_Port 215 of controlling FCF 204 is communicatively coupled to A_Port 233 of second FCDF 230 through an intra-domain A_Port link 242. A_Port 216 of controlling FCF 204 is communicatively coupled to A_Port 272 of third FCDF 270 through an inter domain A_Port link 244. A_Port 224 of first FCDF 220 is communicatively coupled to A_Port 232 of second FCDF 230 through intra-domain A_Port link 241. A_Port 234 of second FCDF 230 is communicatively coupled to VA_Port 272 of third FCDF 270 through an inter domain A_Port link 245.

F_Port 226 of first FCDF 220 is communicatively coupled to N_Port 286 of Host (H1) 280 through link 292. F_Port 227 of first FCDF 220 is communicatively coupled to N_Port 287 of Host (H2) 281 through link 293. F_Port 236 of second FCDF 230 is communicatively coupled to N_Port 288 of Host (H3) 282 through link 294. F_Port 237 of second FCDF 230 is communicatively coupled to N_Port 289 of Host (H4) 283 through link 295.

A_Port 264 of adjacent controlling FCF 254 is communicatively coupled to A_Port 234 of second FCDF 230 through an inter domain A_Port link 246. A_Port 265 of adjacent controlling FCF 254 is communicatively coupled to A_Port 273 through an intra-domain A_Port link 252. F_Port 276 of third FCDF 270 is communicatively coupled to N_Port 290 of Host (H5) 284 through link 296. F_Port 277 of third FCDF 270 is communicatively coupled to N_Port 291 of Host (H6) 285 through link 297.

In one example, FC link 250, principle domain E_Port link 248, intra-domain A_Port links 240, 241, 242, and 252, inter domain A_Port links 244, 245, and 246, and links 292-297 are each native FC communication links. System 200 operates similarly to system 100 previously described and illustrated with reference to FIG. 1, except that in system 200 the FC frames are not encapsulated in Ethernet for transmitting over Ethernet links. Instead, the FC frames are transmitted over FC links.

While the remaining FIGS. 3-10 are directed to an FCoE system as previously described and illustrated with reference to FIG. 1, the disclosure is also applicable to a native FC system as previously described and illustrated with reference to FIG. 2.

Figure 3:
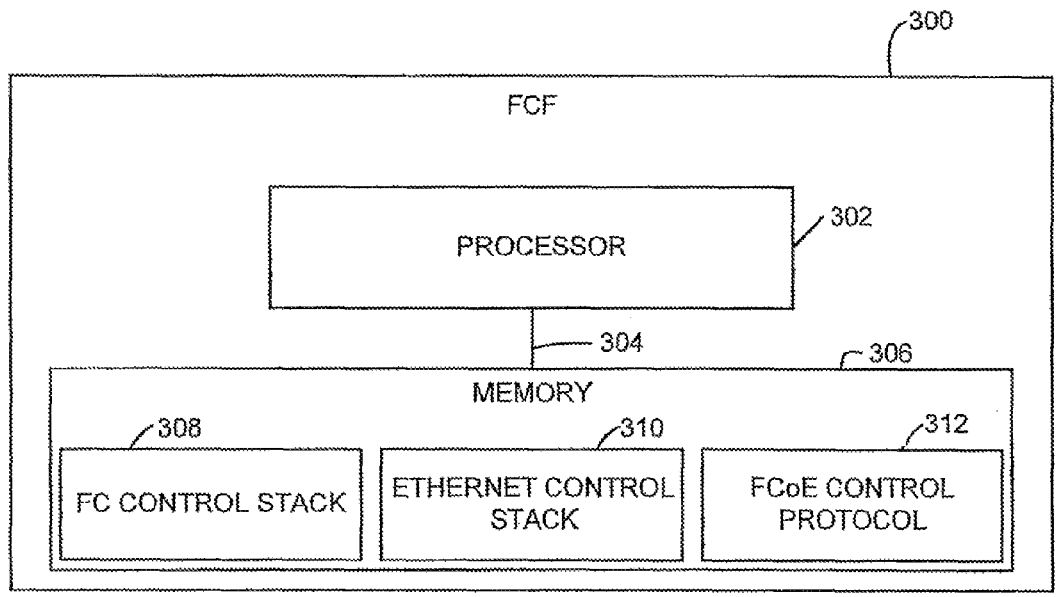
FIG. 3 is a block diagram illustrating one example of an FCoE Forwarder (FCF) control plane architecture.

FIG. 3 is a block diagram illustrating one example of an FCF control plane architecture 300. In one example, FCF control plane architecture 300 is part of controlling FCF 104 and adjacent controlling FCF 154 previously described and illustrated with reference to FIG. 1. FCF control plane architecture 300 includes a processor 302 and a memory 306. Processor 302 is communicatively coupled to memory 306 through a communication link 304.

Processor 302 includes microcontroller, a microprocessor, a Central Processing Unit (CPU), or another suitable processor. In one example, memory 306 stores instructions executed by processor 302 for operating the FCF. Memory 306 includes any suitable combination of volatile and/or non-volatile memory, such as combinations of Random Access Memory (RAM), Read-Only Memory (ROM), flash memory, and/or other suitable memory.

Memory 306 stores instructions executed by processor 302 including instructions for an FC control stack 308, an Ethernet control stack 310, and an FCoE control protocol 312. In one example, processor 302 executes instructions of FC control stack 308, Ethernet control stack 310, and FCoE control protocol 312 to implement the forwarding of FC frames through the FCF. FC control stack 308 includes instructions for handling and forwarding FC frames while Ethernet control stack 310 includes instructions for handling encapsulated FC frames for transmission over Ethernet links. FCoE control protocol 312 includes instructions for the initialization and maintenance of virtual communication links between the FCF and other devices.

Figure 4:
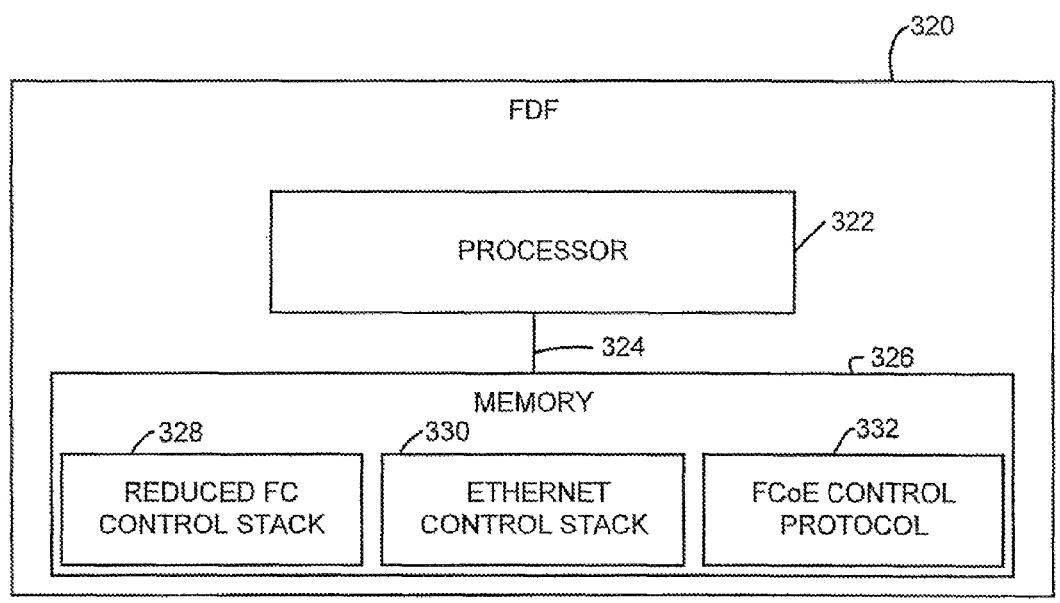
FIG. 4 is a block diagram illustrating one example of an FCoE Data Forwarder (FDF) control plane architecture.

FIG. 4 is a block diagram illustrating one example of an FDF control plane architecture 320. In one example, FDF control plane architecture 320 is part of first FDF 120, second FDF 130, and third FDF 170 previously described and illustrated with reference to FIG. 1. FDF control plane architecture 320 includes a processor 322 and a memory 326. Processor 322 is communicatively coupled to memory 326 through a communication link 324.

Processor 322 includes microcontroller, a microprocessor, a CPU, or another suitable processor. In one example, memory 326 stores instructions executed by processor 322 for operating the FDF. Memory 326 includes any suitable combination of volatile and/or non-volatile memory, such as combinations of RAM, ROM, flash memory, and/or other suitable memory.

Memory 326 stores instructions executed by processor 322 including instructions for a reduced FC control stack 328, an Ethernet control stack 330, and an FCoE control protocol 332. In one example, processor 322 executes instructions of reduced FC control stack 328, Ethernet control stack 330, and FCoE control protocol 332 to implement the handling and forwarding of FC frames through the FDF. FC control stack 328 includes instructions for handling and forwarding FC frames while Ethernet control stack 330 includes instructions for handling encapsulated FC frames for transmission over Ethernet links. FCoE control protocol 332 includes instructions for the initialization and maintenance of virtual communication links between the FDF and other devices.

Figure 5:
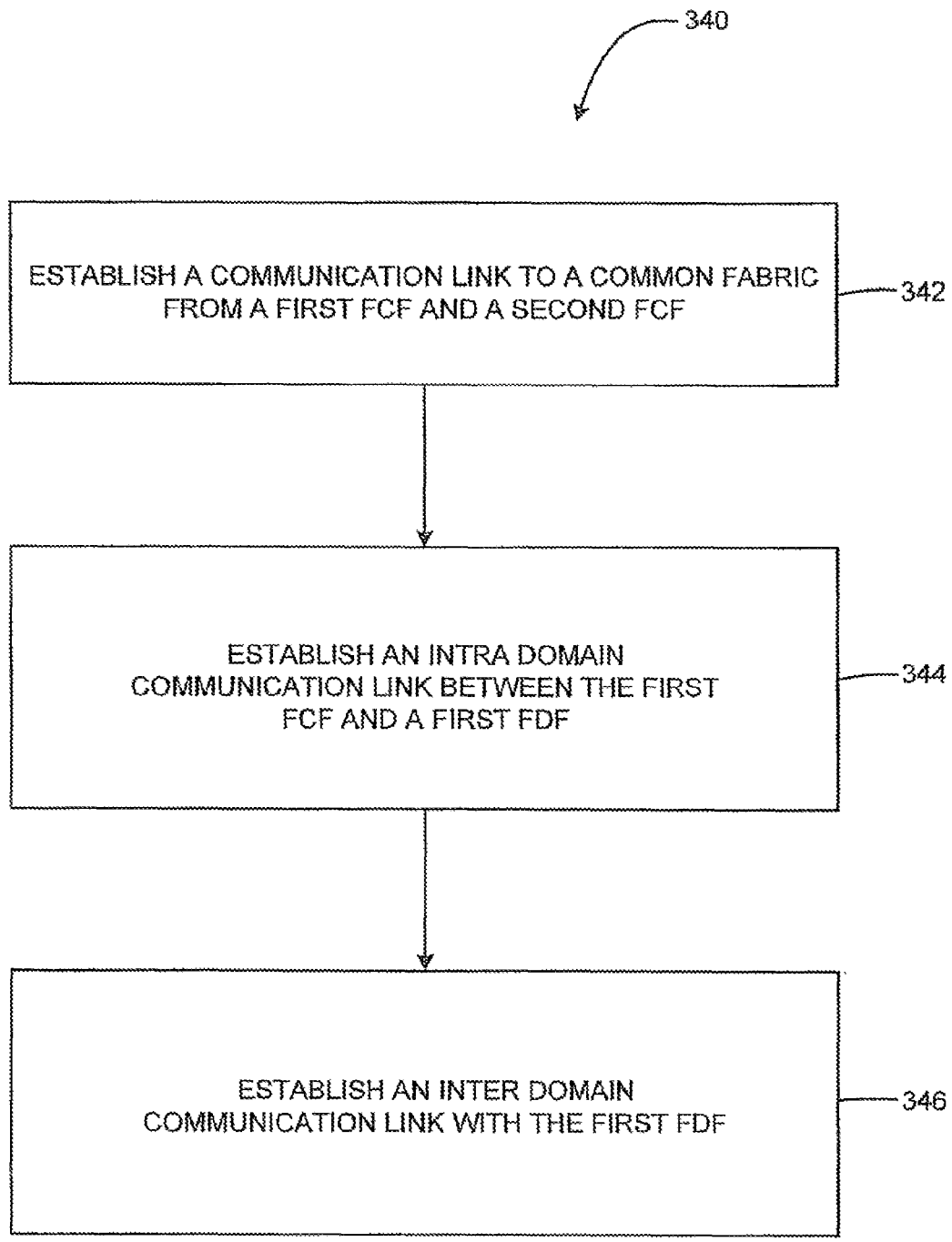
FIG. 5 is a flow diagram illustrating one example of a process for establishing an inter domain link.

FIG. 5 is a flow diagram illustrating one example of a process 340 for establishing an inter domain link, such as inter domain VA_Port Virtual link 144, 145, or 146 previously described and illustrated with reference to FIG. 1 or inter domain A_Port link 244, 245, or 246 previously described and illustrated with reference to FIG. 2. At 342, a communication link to a common fabric from a first FCF and a second FCF is established (e.g., principal domain VE_Port virtual link 148 between controlling FCF 104 and adjacent controlling FCF 154 in FIG. 1 or principal domain E_Port link 248 between controlling FCF 204 and adjacent controlling FCF 254 in FIG. 2).

At 344, an intra-domain communication link between the first FCF and a first FDF is established (e.g., VA_Port virtual link 142 between controlling FCF 104 and second FDF 130 in FIG. 1 or A_Port link 242 between controlling FCF 204 and second FCDF 230 in FIG. 2). At 346, an inter domain communication link with the first FDF is established. In one example, an inter domain communication link between the second FCF and the first FDF is established (e.g., VA_Port virtual link 146 between adjacent controlling FCF 154 and second FDF 130 in FIG. 1 or A_Port link 246 between adjacent controlling FCF 254 and second FCDF 230 in FIG. 2). In another example, an inter domain communication link between a second FDF and the first FDF is established (e.g., VA_Port virtual link 144 between third FDF 170 and second FDF 130 in FIG. 1 or A_Port link 245 between third FCDF 270 and second FCDF 230 in FIG. 2).

Figure 6:
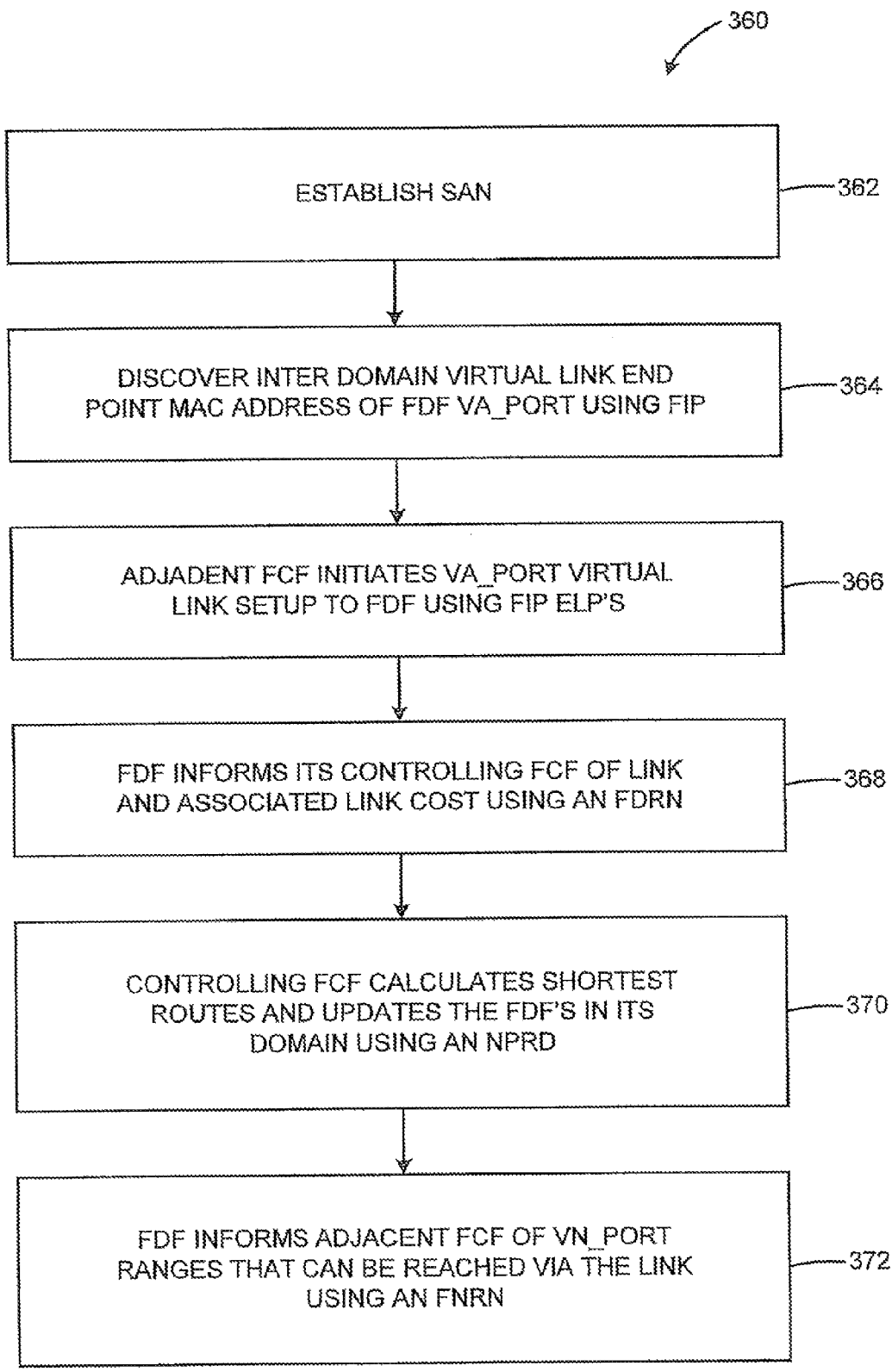
FIG. 6 is a flow diagram illustrating one example of a process for establishing an inter domain virtual link between an FDF and an adjacent FCF.

FIG. 6 is a flow diagram illustrating one example of a process 360 for establishing an inter domain virtual link between an FDF and an adjacent FCF, such as inter domain VA_Port virtual link 144 or 146 previously described and illustrated with reference to FIG. 1. At 362, the SAN is established. For example, establishing the SAN includes establishing principal domain VE_Port virtual link 148 between controlling FCF 104 and adjacent controlling FCF 154 in FIG. 1. In one example, a Switch Internal Link Service (SW_ILS) is used to exchange control frames between devices providing a distributed switch.

At 364, the inter domain virtual link end point Media Access Control (MAC) address of the FDF VA_Port is discovered using the FCoE Initialization Protocol (FIP). The MAC address is a 6-byte Ethernet address used to identify source or destination of a frame. FIP is used to discover and initialize FCoE capable devices connected to an Ethernet network. For example, the MAC address of third FDF 170 (FIG. 1) is discovered using the FIP. In one example, FCFs store configuration data listing the FDFs in other domains to which the FCF should set up inter domain VA_Port virtual links. In one example, the configuration data includes the switch names of the FDFs in other domains to which the FCF should set up inter domain VA_Port virtual links. For example, adjacent controlling FCF 154 (FIG. 1) is specified to set up an inter domain VA_Port virtual link with second FDF 130 (FIG. 1). In other examples, the FDFs to which the FCF should set up inter domain VA_Port virtual links is specified using another suitable technique.

At 366, an adjacent FCF initiates a VA_Port virtual link setup to the FDF using FIP Exchange Link Parameters (ELPs). FIP ELPs are used to exchange protocol information over VE_Ports or E_Ports. For example, adjacent controlling FCF 154 initiates a VA_Port virtual link setup to second FDF 130 using FIP ELPs. In one example, both the C and D bits in the FIP header are set to 0 and bits 13 and 14 in the ELP header are set to zero to indicate that an FCF is an adjacent controlling FCF. In another example, an additional bit is added to the FIP header to indicate that an FCF is an adjacent controlling FCF.

At 368, the FDF informs its controlling FCF of the link and the associated link cost using a Fibre Channel Data Forwarder (FCDF) Reachability Notification (FDRN). An FDRN is a SW_ILS used by an FDF or FCDF to communicate to the controlling FCF that is has instantiated a VA_Port virtual link with another FDF or FCDF or with another FCF. For example, second FDF 130 (FIG. 1) informs controlling FCF 104 of inter domain VA_Port virtual link 146 and the associated link cost using an FDRN.

At 370, the controlling FCF calculates the shortest path routes and updates the FDFs in its domain using an N_Port_ID Range Notification (NPRD). An NPRD is a SW_ILS used by the controlling FCF to communicate to an FDF or FCDF the N_Port_ID routing information for the distributed switch. For example, controlling FCF 104 calculates the shortest path routes and updates FDFs 120 and 130 with routing information for forwarding FC frames over inter domain VA_Port virtual link 146 using an NPRD.

At 372, the FDF informs the adjacent controlling FCF of VN_Port ranges that can be reached via the link using an FDF N_Port_ID Range Notification (FNRN). An FNRN is an added SW_ILS used by the FDF to communicate to an adjacent FCF the N_Port_ID routing information for the distributed switch. Although block 372 is provided after block 370, the NPRD and the FNRN are independent and do not have to be performed in any particular order after initialization of the link. For example, second FDF 130 informs adjacent controlling FCF 154 of VN_Port ranges (e.g., for VN_Ports 186-189) that can be reached via inter domain VA_Port virtual link 146 using an FNRN.

To maintain an inter domain VA_Port virtual link between an FDF and an adjacent controlling FCF, the connection between the two domains needs to be maintained (i.e., the connection between the controlling FCF and the adjacent controlling FCF). The connection between the two domains may be maintained via a principle domain VE_Port virtual link (e.g., VE_Port virtual link 148 (FIG. 1)) or via the FC fabric (e.g., FC fabric 102 where both controlling FCF 104 and adjacent controlling FCF 154 each have an FC link to FC fabric 102). If the connection between the two domains is lost for any reason, then the following will occur to disestablish the inter domain VA_Port virtual link.

1) Routing tables are updated in the adjacent controlling FCF for the corresponding domain via Fibre Channel Shortest Path (FSPF), which clears the forwarding path from the adjacent controlling FCF to the FDFs in the other domain.

2) The controlling FCF clears the forwarding path in FDFs in question via a VA_Port NPRD.

3) The adjacent controlling FCF deinstantiates the inter domain VA_Port virtual link affected using a FIP Clear Virtual Link.

Figure 7:
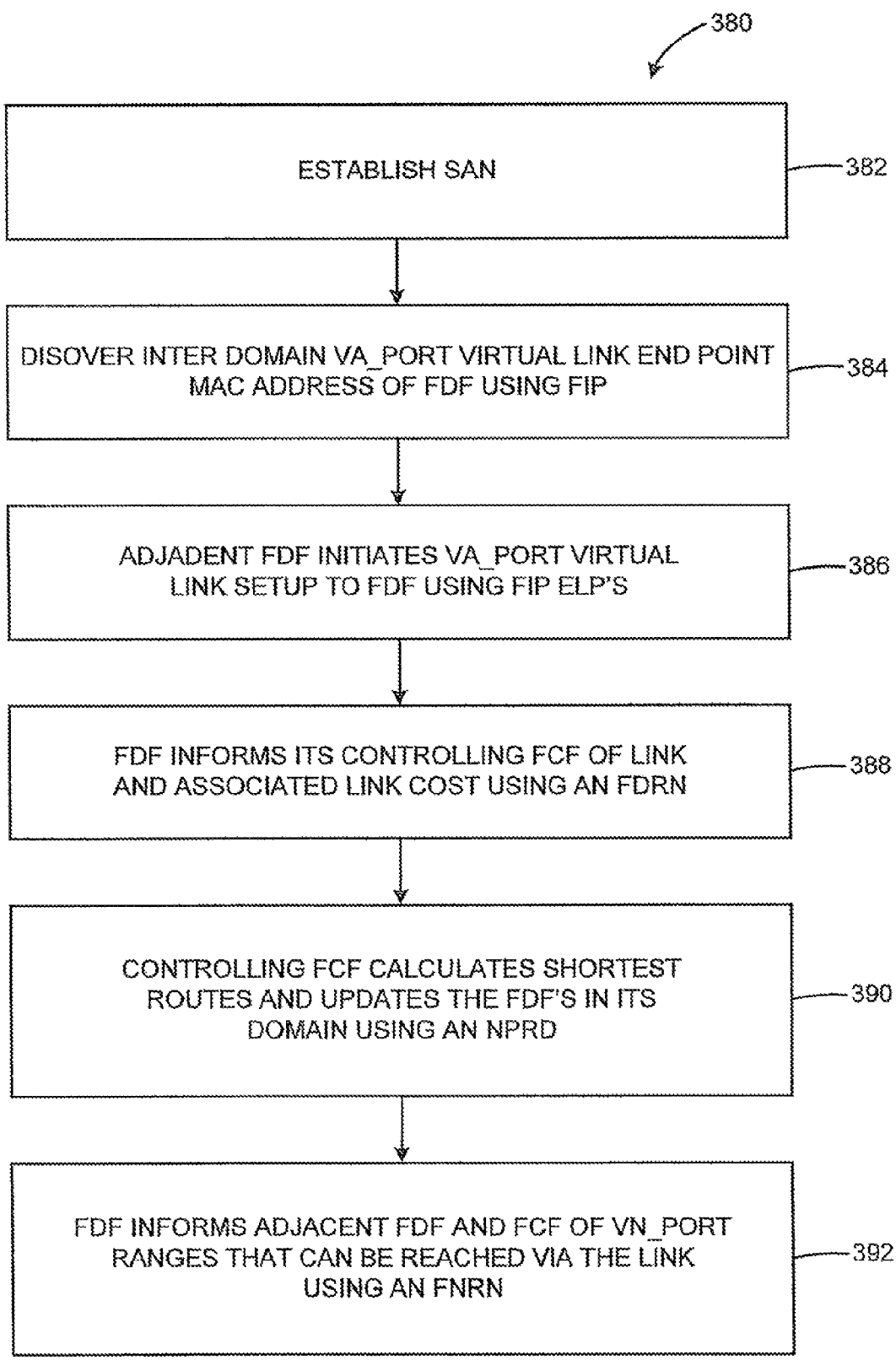
FIG. 7 is a flow diagram illustrating one example of a process for establishing an inter domain virtual link between an FDF and an adjacent FDF.

FIG. 7 is a flow diagram illustrating one example of a process 380 for establishing an inter domain virtual link between an FDF and an adjacent FDF, such as inter domain VA_Port virtual link 145 previously described and illustrated with reference to FIG. 1. At 382, the SAN is established. For example, establishing the SAN includes establishing principal domain VE_Port virtual link 148 between controlling FCF 104 and adjacent controlling FCF 154 in FIG. 1.

At 384, the inter domain virtual link end point MAC address of the FDF VA_Port is discovered using the FIP. For example, the MAC address of third FDF 170 (FIG. 1) is discovered using the FIP. In one example, FCFs store configuration data listing the FDFs in other domains to which an FDF should set up inter domain VA_Port virtual links. In one example, the configuration data includes the switch names of the FDFs in other domains to which an FDF should set up inter domain VA_Port virtual links. For example, third FDF 170 (FIG. 1) is specified to set up an inter domain VA_Port virtual link with second FDF 130 (FIG. 1). In other examples, the FDFs to which an FDF should set up inter domain VA_Port virtual links is specified using another suitable technique.

At 386, an adjacent FDF initiates a VA_Port virtual link setup to the FDF using FIP ELPs. For example, third FDF 170 initiates a VA_Port virtual link setup to second FDF 130 using FIP ELPs. In one example, the C bit in the FIP header is set to 0, the D bit in the FIP header is set to 1, and bits 13 and 14 in the ELP header are set to zero to indicate that an FDF is an adjacent FDF. In another example, an additional bit is added to the FIP header to indicate that an FDF is an adjacent FDF.

At 388, the FDF informs its controlling FCF of the link and the associated link cost using an FDRN. For example, second FDF 130 (FIG. 1) informs controlling FCF 104 of inter domain VA_Port virtual link 145 and the associated link cost using an FDRN.

At 390, the controlling FCF calculates the shortest path routes and updates the FDFs in its domain using an NPRD. For example, controlling FCF 104 calculates the shortest path routes and updates FDFs 120 and 130 with routing information for forwarding FC frames over inter domain VA_Port virtual link 145 using an NPRD.

At 392, the FDF informs the adjacent FDF and the adjacent controlling FCF of VN_Port ranges that can be reached via the link using an FNRN. The adjacent FDF relays the FNRN from the FDF to the adjacent controlling FCF. Although block 392 is provided after block 300, the NPRD and the FNRN are independent and do not have to be performed in any particular order after initialization of the link. For example, second FDF 130 informs third FDF 170 of VN_Port ranges (e.g., for VN_Ports 186-189) that can be reached via inter domain VA_Port virtual link 145 using an FNRN, Third FDF 170 relays the FNRN to adjacent controlling FCF 154.

To maintain an inter domain VA_Port virtual link between an FDF and an adjacent FDF, the connection between the two domains needs to be maintained (i.e., the connection between the controlling FCF and the adjacent controlling FCF). The connection between the two domains may be maintained via a principle domain VE_Port virtual link (e.g., VE_Port virtual link 148 (FIG. 1)) or via the FC fabric (e.g., FC fabric 102 where both controlling FCF 104 and adjacent controlling FCF 154 each have an FC link to FC fabric 102). If the connection between the two domains is lost for any reason, then the following will occur to disestablish the inter domain VA_Port virtual link.

1) Routing tables are updated in the controlling FCF and the adjacent controlling FCF for the corresponding domains via FSPF, which clears the forwarding path within the controlling FCF and the adjacent controlling FCF.

2) Each of the controlling FCF and the adjacent controlling FCF clear the forwarding path in FDFs in question via a VA_Port NPRD.

3) The controlling FCF and the adjacent controlling FCF instruct their respective FDFs to deinstantiate the inter domain VA_Port virtual link affected using a FIP Clear Virtual Link (FCVL).

Figure 13:
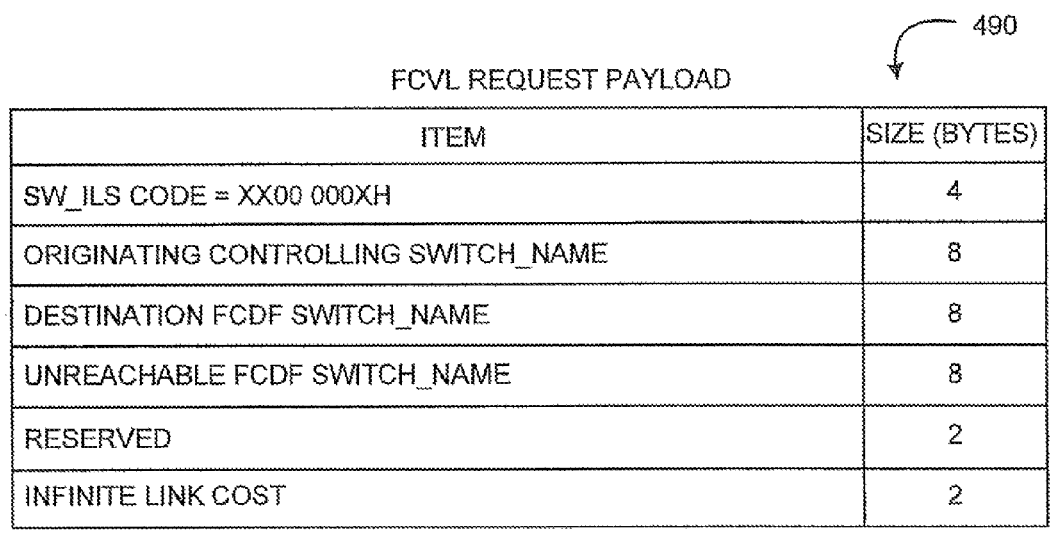
FIG. 13 is a table illustrating one example of FCoE Initialization Protocol (FIP) Clear Virtual Link (FCVL) request payload for deinstantiating a VA_Port virtual link between an FDF and an adjacent FDF.

FIG. 13 is a table illustrating one example of an FCVL request payload 490 for deinstantiating a VA_Port virtual link between an FDF and an adjacent FDF. An FCVL is an added SW_ILS for implementing VA_Port virtual links between an FDF and an adjacent FDF. FCVL request payload 490 includes the SW_ILS code item, the originating controlling Switch_Name item, the destination FCDF Switch_Name item, the unreachable FCDF Switch_Name item, the reserved item, and the infinite link cost item. Each item is a specified size in bytes.

Figure 8:
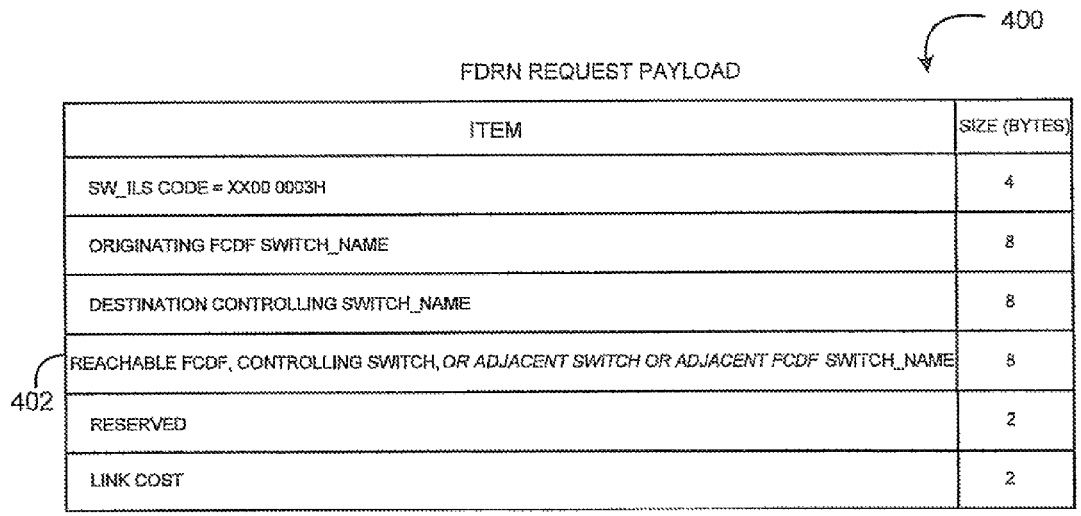
FIG. 8 is a table illustrating one example of a Fibre Channel Data Forwarder (FCDF) Reachability Notification (FDRN) request payload.

FIG. 8 is a table illustrating one example of an FCDF Reachability Notification (FDRN) request payload 400. FDRN request payload 400 includes the SW_ILS code item, the originating FCDF Switch_Name item, the destination controlling Switch_Name item, the reachable FCDF, controlling switch, or adjacent switch or adjacent FCDF Switch_ Name item, the reserved item, and the link cost item. Each item is a specified size in bytes. The adjacent switch or adjacent FCDF Switch_Name as indicated in item 402 has been added to the FDRN request payload to implement the current disclosure. The adjacent switch Switch_ Name indicates the adjacent FCF to which an FDF has an inter domain VA_Port virtual link. The adjacent FCDF Switch_Name indicates the adjacent FDF to which an FDF has an inter domain VA_Port virtual link.

Similar to the FDRN, the adjacent switch or adjacent FCDF Switch_Name is also added to the FCDF Unreachability Notification (FDUN) SW_ILS to implement the current disclosure. The FDUN is used by an FDF or FCDF to communicate to the controlling FCF that the FDF or FCDF has deinstantiated a VA_Port virtual link with another FDF or FCDF or with another FCF.

Figure 9:
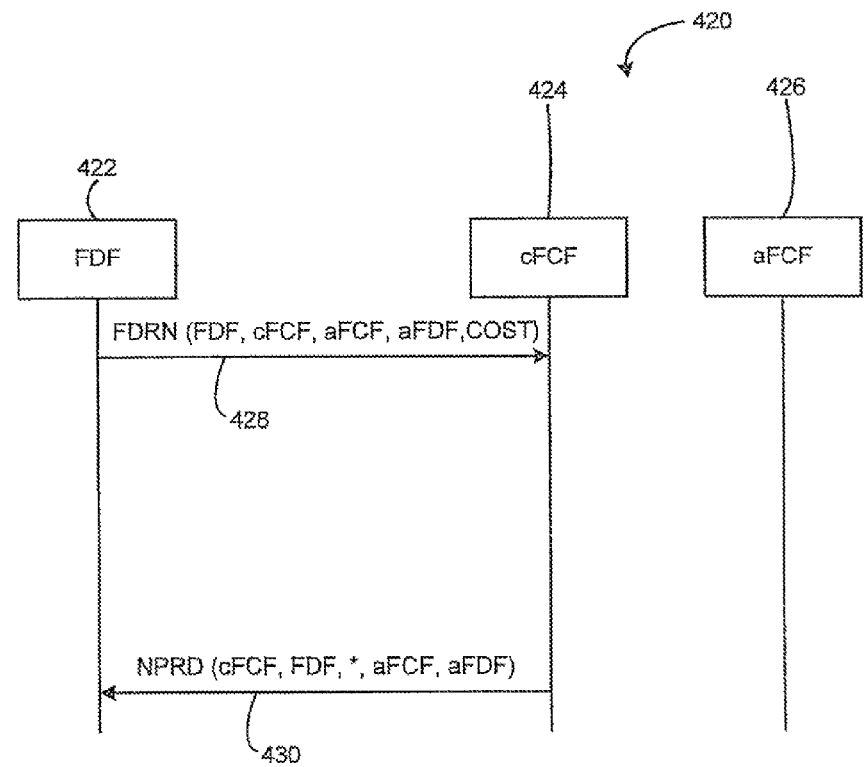
FIG. 9 is a diagram illustrating one example of communications between an FDF and a controlling FCF for establishing an inter domain VA_Port virtual link.

FIG. 9 is a diagram illustrating one example of communications 420 between an FDF and a controlling FCF (cFCF) for establishing an inter domain VA_Port virtual link. FDF 422 and cFCF 424 are involved in these communications 420 while adjacent FCF (aFCF) 426 is not. FDF 422 sends an FDRN to cFCF 424 as indicated at 428. The FDRN includes FRDN request payload 400 previously described and illustrated with reference to FIG. 8. For example, second FDF 130 (FIG. 1) sends an FDRN including the originating second FDF 130 Switch_Name, the destination controlling FCF 104 Switch_Name, the adjacent controlling FCF 154 Switch_Name, and the link cost to controlling FCF 104 to inform controlling FCF 104 of inter domain VA_Port virtual link 146. In another example, second FDF 130 (FIG. 1) sends an FDRN including the originating second FDF 130 Switch_Name, the destination controlling FCF 104 Switch_ Name, the adjacent third FDF 170 Switch_Name, and the link cost to controlling FCF 104 to inform controlling FCF 104 of inter domain VA_Port virtual link 145.

In response to the FDRN from FDF 422, the cFCF 424 send an NPRD to FDF 422 as indicated at 430. The NPRD includes the originating controlling FCF Switch_Name, the destination FDF Switch_Name, the route information, and the adjacent FCF or adjacent FDF Switch_Name. For example, controlling FCF 104 (FIG. 1) sends an NPRD including the originating controlling FCF 104 Switch_ Name, the destination second FDF 130 Switch_Name, the route information, and the adjacent controlling FCF 154 Switch_Name for inter domain VA_Port virtual link 146. In another example, controlling FCF 104 (FIG. 1) sends an NPRD including the originating controlling FCF 104

Switch_Name, the destination second FDF 130 Switch_Name, the route information, and the adjacent third FDF 170 Switch_Name for inter domain VA_Port virtual link 145.

Figures 10, 11:
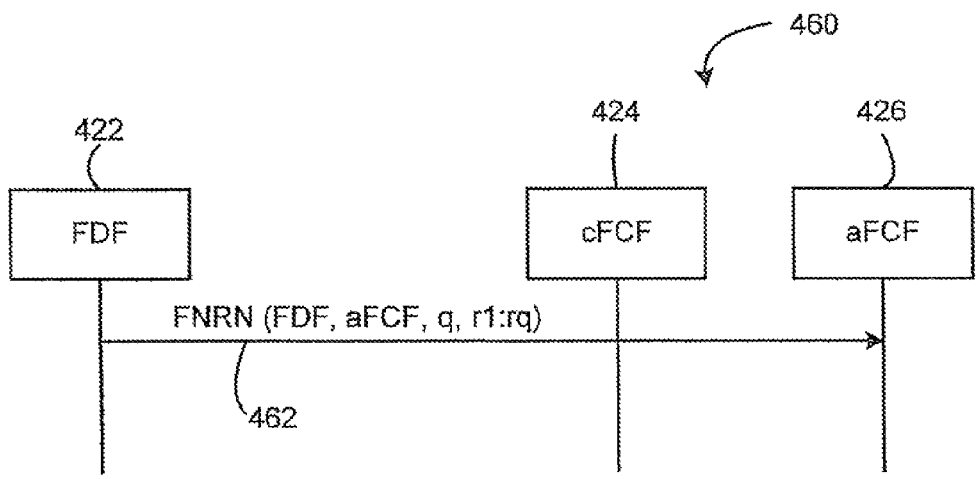
FIG. 10 is a table illustrating one example of an FDF N_Port_ID Range Notification (FNRN) payload.
FIG. 11 is a diagram illustrating one example of a communication between an FDF and an adjacent FCF for establishing an inter domain VA_Port virtual link between an FDF and an adjacent FCF.

FIG. 10 is a table illustrating one example of an FDF N_Port_ID Range Notification (FNRN) payload 440. FNRN payload 440 includes a SW_ILS code item, the originating FCDF Switch_Name item, the destination adjacent switch Switch_Name item, the number of N_Port_ID ranges (q) item, and the N_Port_ID ranges #1 through #q items. Each item is a specified size in bytes. The FNRN is an added SW_ILS to implement the current disclosure.

FIG. 11 is a diagram illustrating one example of a communication 460 between an FDF and an adjacent FCF for establishing an inter domain VA_Port virtual link between an FDF and an adjacent FCF. FDF 422 and aFCF 426 are involved in this communication 460 while cFCF 424 is not. FDF 422 sends an FNRN to aFCF 426 as indicated at 462. The FNRN includes FNRN payload 440 previously described and illustrated with reference to FIG. 10. For example, second FDF 130 (FIG. 1) sends to adjacent controlling FCF 154 an FNRN including the originating second FDF 130 Switch_Name, the adjacent controlling FCF 154 Switch_Name, the number of N_Port_ID ranges (q) (e.g., 2 for VN_Ports 188 and 189), and the N_Port_ID ranges (r1:rq) (e.g., r1:r2 for VN_Ports 188 and 189).

Figure 12:
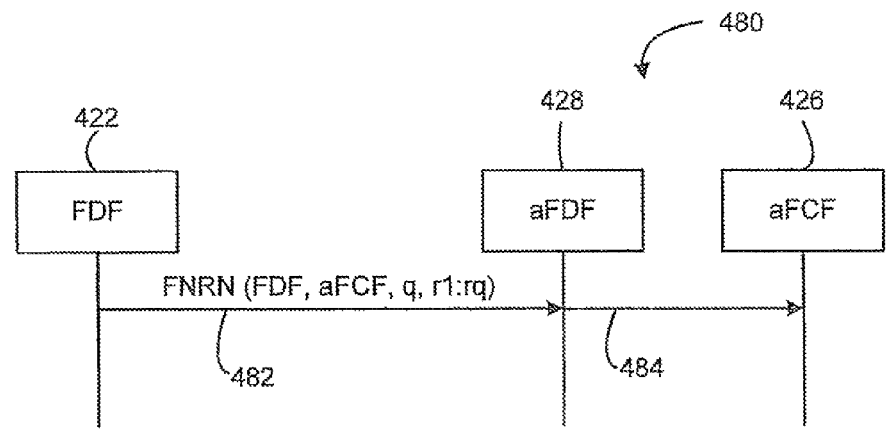
FIG. 12 is a diagram illustrating one example of a communication between an FDF and an adjacent FDF and an adjacent FCF for establishing an inter domain VA_Port virtual link between an FDF and an adjacent FDF.

FIG. 12 is a diagram illustrating one example of a communication 480 between an FDF and an adjacent FDF and an adjacent FCF for establishing an inter domain VA_Port virtual link between an FDF and an adjacent FDF. FDF 422 sends an FNRN to the adjacent FDF (aFDF) 428 as indicated at 482. The adjacent FDF forwards the FNRN to the adjacent FCF 426 as indicated at 484. The FNRN includes FNRN payload 440 previously described and illustrated with reference to FIG. 10. For example, second FDF 130 (FIG. 1) sends to adjacent third FDF 170 an FNRN including the originating second FDF 130 Switch_Name, the adjacent controlling FCF 154 Switch_Name, the number of N_Port_ID ranges (q) (e.g., 2 for VN_Ports 188 and 189), and the N_Port_ID ranges (r1:rq) (e.g., r1:r2 for VN_Ports 188 and 189). The adjacent third FDF 170 then forwards the FNRN to adjacent controlling FCF 154.

Examples described herein provide a flatter and more flexible SAN topology having a reduced latency and in which potential choke points are removed due to the inter domain links. The examples described herein also provide improved load balancing due to the inter domain links, which also reduces lost traffic in the event of a fail over. As such, high availability operations are improved.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A method comprising:
    establishing a communication link between a first Fibre Channel Forwarder (FCF) and a Fibre Channel (FC) fabric, the first FCF providing a first domain;
    establishing a communication link between a second FCF and the FC fabric, the second FCF providing a second domain, wherein the second domain is different from the first domain;
    establishing a first intra-domain link between the first FCF and a first device, the first device comprising one of a Fibre channel over Ethernet Data Forwarder (FDF) and a Fibre Channel Data Forwarder (FCDF); and
    establishing an inter domain link between the first device and the second domain.

2. The method of claim 1, wherein establishing the inter domain link comprises establishing the inter domain link between the first device and the second FCF.

3. The method of claim 2, comprising establishing the inter domain link by:
    discovering an inter domain link end point Media Access Control (MAC) address of the first device;
    initiating from the second FCF, a link setup to the first device;
    informing the first FCF, from the first device, of the link;
    calculating at the first FCF, the shortest path routes and updating the first device with the shortest path routes; and
    informing the second FCF, from the first device, of port ranges that can be reached via the inter domain link.

4. The method of claim 1, further comprising:
    establishing a second intra-domain link between the second FCF and a second device, the second device comprising one of an FDF and an FCDF, wherein establishing the inter domain link comprises establishing the inter domain link between the first device and the second device.

5. The method of claim 4, comprising establishing the inter domain link by:
    discovering an inter domain link end point Media Access Control (MAC) address of the first device;
    initiating a link setup between the second device and the first device;
    informing the first FCF, from the first device, of the link;
    calculating at the first FCF, the shortest path routes and updating the first device with the shortest path routes;
    informing the second device, from the first device, of port ranges that can be reached via the inter domain link; and
    forwarding to the second FCF, from the second device, the port ranges that can be reached via the inter domain link.

6. The method of claim 4, further comprising:
    disestablishing the inter domain link in response to the communication link between the FC fabric and one of the first FCF and the second FCF being broken.

7. A Fibre Channel Forwarder (FCF) comprising:
    a processor; and
    a memory communicatively coupled to the processor, the memory storing instructions causing the processor, after execution of the instructions by the processor, to:
        establish a link to a Fibre Channel (FC) fabric;
        establish an intra-domain link between the FCF and a first device in a first domain, the first device comprising one of a Fibre channel over Ethernet Data Forwarder (FDF) and a Fibre Channel Data Forwarder (FCDF); and
        establish an inter domain link between one of the FCF and a second device and between the first device and the second device, the second device comprising one of an FDF and an FCDF and the second device being in a second domain wherein the second domain is different from the first domain.

8. The FCF of claim 7, wherein the memory stores instructions causing the processor, after execution of the instructions by the processor, to establish an inter domain VA_Port virtual link between the FCF and the second device by:
discovering an inter domain link end point Media Access Control (MAC) address of the second device;
initiating a VA_Port virtual link setup to the second device; and
receiving VN_Port ranges that can be reached via the VA_Port virtual link from the second device.

9. The FCF of claim 7, wherein the memory stores instructions causing the processor, after execution of the instructions by the processor, to establish an inter domain VA_Port virtual link between the first device and the second device by:
discovering an inter domain link end point Media Access Control (MAC) address of the second device;
receiving a Fibre Channel Data Forwarder Reachability Notification (FDRN) from the first device; and
calculating the shortest routes and updating the first device using an N_Port_ID Range Notification (NPRD) in response to the FDRN.

10. The FCF of claim 7, further comprising:
one of an A_Port and a VA_Port for establishing the inter domain link.

11. A first Fibre Channel over Ethernet Data Forwarder (FDF) comprising:
a processor; and
a memory communicatively coupled to the processor, the memory storing instructions causing the processor, after execution of the instructions by the processor, to:
establish an intra-domain Virtual A_Port (VA_Port) virtual link between the first FDF and a first Fibre Channel Forwarder (FCF) in a first domain, the first FCF having a link to a Storage Area Network (SAN); and
establish an inter domain VA_Port virtual link between the first FDF and one of a second FCF and a second FDF, the second FCF and the second FDF being in a second domain, wherein the second domain is different from the first domain.

12. The first FDF of claim 11, wherein the memory stores instructions causing the processor, after execution of the instructions by the processor, to establish the inter domain VA_Port virtual link between the FDF and one of the second FCF and the second FDF by:
informing the first FCF of the inter domain VA_Port virtual link using a Fibre Channel Data Forwarder Reachability Notification (FDRN); and
receiving an N_Port_ID Route Notification (NPRD) from the first FCF in response to the FDRN.

13. The first FDF of claim 11, wherein the memory stores instructions causing the processor, after execution of the instructions by the processor, to establish the inter domain VA_Port virtual link between the FDF and the second FCF by:
informing the second FCF of the N_Port ranges that can be reached via the inter domain VA_Port virtual link using an FDF N_Port_ID Range Notification (FNRN).

14. The first FDF of claim 11, wherein the memory stores instructions causing the processor, after execution of the instructions by the processor, to establish the inter domain VA_Port virtual link between the FDF and the second FDF by:
informing the second FDF and the second FCF of the N_Port ranges that can be reached via the inter domain VA_Port virtual link using an FDF N_Port_ID Range Notification (FNRN).

15. The first FDF of claim 11, wherein the memory stores instructions causing the processor, after execution of the instructions by the processor, to disestablish, in response to the first FCF link to the SAN being broken, the inter domain VA_Port virtual link between the FDF and the second FDF by:
receiving a Switch Internal Link Service (SW_ILS) "FIP Clear Virtual Link" (FCVL) from the first FCF to deinstantiate the inter domain VA_Port virtual link using FIP Clear Virtual Link.

* * * * *